United States Patent [19]

Horiguchi et al.

[11] Patent Number: 5,056,095
[45] Date of Patent: Oct. 8, 1991

[54] SEMICONDUCTOR MEMORY HAVING ERROR CORRECTION CIRCUIT

[75] Inventors: Masashi Horiguchi, Kokubunji; Masakazu Aoki, Tokorozawa; Kiyoo Itoh, Higashikurume, all of Japan

[73] Assignee: Hitachi, Ltd., Tokyo, Japan

[21] Appl. No.: 296,135

[22] Filed: Jan. 12, 1989

[30] Foreign Application Priority Data

Jan. 13, 1988 [JP] Japan .................. 63-3865

[51] Int. Cl.[5] ........................................ H03M 13/00
[52] U.S. Cl. .................. 371/40.1; 371/40.4; 371/11.2
[58] Field of Search ............ 371/40.1, 40.4, 11.2, 371/22.6, 40.2, 40.3

[56] References Cited

U.S. PATENT DOCUMENTS

| | | | |
|---|---|---|---|
| 3,851,306 | 11/1974 | Patel | 371/40.3 |
| 4,625,313 | 11/1986 | Springer | 371/22.6 |
| 4,651,321 | 3/1987 | Woffinden et al. | 371/40.1 |
| 4,763,329 | 8/1988 | Green | 371/11.2 |
| 4,780,875 | 10/1988 | Sakai | 371/40.1 |
| 4,817,095 | 3/1989 | Smelser et al. | 371/40.1 |

Primary Examiner—Jerry Smith
Assistant Examiner—Phung My Chung
Attorney, Agent, or Firm—Kenyon & Kenyon

[57] ABSTRACT

To reduce the number of wirings required between a plurality of memory blocks and a plurality of error correction circuits and thereby reduce the chip area occupied by a semiconductor memory, the present invention provides a semiconductor memory which comprises (1) a plurality of memory blocks (12) for storing information bits, (2) another memory block (13) for storing test bits, (3) a plurality of multiplexers (26) disposed at the respective output sections of the memory blocks (12), (4) a plurality of parity test circuits (27) each responding to bit information for a parity test which is generated from one output from the corresponding one of the multiplexers (26), (5) a syndrome bus (22) responding to both the respective outputs of the parity test circuits (26) and the output of the another memory block (13), and (6) a plurality of error correction circuits (21) each responding to both output data (28) generated from the other output of the corresponding one of the multiplexers (26) and a syndrome generated from the syndrome bus (22).

22 Claims, 7 Drawing Sheets

12··· MEMORY BLOCK FOR STORING
      INFORMATION BITS
19··· SENSE AMPLIFIER
26··· MULTI-PLEXER
27··· PARITY CHECK CIRCUIT
100, 110, 120, 130··· SUB-BLOCK
101··· MEMORY CELL
111··· DIFFERENTIAL AMPLIFIER
140, 141··· DECODER
131··· SIGNAL LINE
132··· EXCLUSIVE OR GATE

FIG. 3

150 ~ 154 ··· P CHANNEL MOS TRANSISTOR

155 ~ 159 ··· n CHANNEL MOS TRANSISTOR

160 ~ 163 ··· n CHANNEL MOS TRANSISTOR

SEMICONDUCTOR MEMORY HAVING ERROR CORRECTION CIRCUIT

BACKGROUND OF THE INVENTION

1. Field of the Invention

The present invention relates to a semiconductor memory and, more particularly, to a semiconductor memory having an error correcting function that employs an error correcting code (hereinafter referred to as "ECC").

2. Description of the Art

With the achievement of high integration of semiconductor memories, the size of memory cells has been reduced and, as a result, so-called soft errors, that is, the phenomena that information stored in memory cells are destroyed by alpha particles or the like, have become a serious problem. To cope with this problem, it is an effective practice to employ an error correcting method such as that discussed, for example, in ISSCC Digest of Technical Papers, pp. 22-23, February, 1987. Error correction will be briefly explained hereinunder.

Error correction is a procedure wherein redundant bits (i.e., test bits) are added to bits carrying information which is to be stored (i.e., information bits) according to a certain rule to impart redundancy to the data, thereby detecting and correcting an error occurring in a part of the data in the light of the certain rule. Error correcting codes constitute a system, which provides a rule according to which check bits are added to give information bits so that error correction is available. Such error correcting codes include two dimensional codes and multi-dimensional codes, and two dimensional codes include Hamming codes, horizontal and vertical parity, BCH codes, etc.

The procedure of error correction is carried out in two steps, that is, the step of calculating a syndrome and the step of correcting an erroneous bit by the use of the syndrome. Syndrome is an extract from information concerning errors in data and it is arithmetically obtained by selecting some bits from data according to a certain rule and making a check for the parity (even or odd error correcting code) of the selected bits. It should be noted that error correcting codes and error correcting methods that employ the same are described in detail, for example, in Miyagawa et al. "Code Theory", Shokodo.

As described above, to cope with soft errors, it is an effective practice to employ a method whereby errors are corrected. This error correcting method suffers, however, from the following problems.

It is necessary, in order to effect error correction, to add check bits to bits carrying information which is to be stored. Since extra memory cells are needed to store the check bits, it is preferable to minimize the number of check bits employed. It is, however, known from the code theory that there is a lower limit to the number of check bits needed for error correction. According to the code theory, it is necessary, in order to enable correction of a single erroneous bit among a total of $(k+m)$ bits, to satisfy the following condition:

$$k \leq 2^m - 1 - m \quad (1)$$

where k: the number of information bits employed to effect a single error correction m: the number of check bits employed to effect a single error correction It will be understood from the above expression that, the larger the value of m, the smaller the redundancy m/k of the code. For example, if $k=32$, then $m \geq 6$ and therefore $m/k \geq 0.19$;

if $k=64$, then $m \geq 7$ and therefore $m/k \geq 0.11$; and if $k=128$, then $m \geq 8$ and therefore $m/k \geq 0.06$.

Accordingly, it is only necessary in order to decrease the redundancy to increase the number k of information bits which are employed to effect a single error correction.

On the other hand, the error correction circuit that is used to effect error correction needs $(k+m)$-bit inputs. More specifically, $(k+m)$ wirings are needed between a memory array and the error correction circuit. Accordingly, it is preferable to reduce the value of k from the viewpoint of the number of wirings required.

One method which is contrived to satisfy the above-described requirements which are contrary to each other is presented in Japanese Patent Laid-Open No. 62-119800 (1987). FIG. 7 is a block diagram of a semiconductor memory which is shown in the specification of the above-described Japanese Patent Laid-Open No. 62-119800 (1987). In the figure, the reference numeral 11 denotes a memory array, 12 memory blocks for storing information bits, 13 a memory block for storing check bits, 17 multiplexers, 18 output buffers, 19 sense amplifiers, 20 parity check circuits, 21 error correction circuits, and 22 a bus for connecting together the memory blocks to carry out syndrome calculation (the bus 22 being hereinafter referred to as "syndrome bus"). It should be noted that the syndrome bus 22 has in-bus parity check circuits 22a disposed thereon. In this semiconductor memory, the memory array 11 is divided into a plurality (b; b=4 in this arrangement) of memory blocks 12 for storing information bits and one memory block 13 for storing check bits. A combination of a parity check circuit 20 and an error correction circuit 21 is provided in close proximity to each memory block 12 for storing information bits. Each parity check circuit 20 effects a pre-stage processing for syndrome calculation that is, a parity check for each memory block. The parity check circuits 20 and the memory block 13 for storing check bits are connected together through the syndrome bus 22 where the post-stage processing for syndrome calculation is carried out. More specifically, the parity check results are integrated to generate a syndrome. Each error correction circuit 21 effects error correction using the thus generated syndrome. Pieces of the information thus corrected are output from output terminal $Q_0$ to $Q_3$ through the multiplexers 17 and the output buffers 18, respectively.

With this method, the number of relatively long wirings for connection between the memory blocks is one, i.e., only the syndrome bus 22. Since the number of wirings that connect together the memory blocks in this arrangement is m (2 m for the total number of outgoing and incoming wirings), the number of required wirings is much smaller than the aforementioned number, i.e., $(k+m)$.

SUMMARY OF THE INVENTION

The problem of the above-described related art is that, although the number of relatively long wirings for connection between the memory blocks can be reduced to m, as described above, the number of the output wirings 23 and 24 which extend from the memory blocks 12 and 13 are still large. The number of wirings 23 for one memory block is k/b, while the number of wirings 24 is m. Therefore, there is no change in the circumstances where a total of (k+m) wirings are needed. Since it is necessary to dispose these wirings in direct connection with the respective memory cells, the related art leads to an increase in the occupation area of the memory blocks 12 and 13 and also an increase in the chip area occupied by the semiconductor memory.

The present invention solve the above-described problems and provide a semiconductor memory which is provided with an error correcting function with less increase in the chip area.

To this end, according to the present invention, a select circuit is disposed at the output section of each memory block for storing information bits and in this select circuit are selected an output bit and predetermined bits for parity check. A combination of a select circuit and a parity check circuit is provided in direct connection with the output section of each memory block for storing information bits so as to effect a parity check of the predetermined bits, and error correction for the output bit is made through a syndrome generating circuit by the use of the output of the parity check circuit.

More specifically,,a combination of a select circuit and a parity check circuit is provided in direction connection with the output section of each memory block so as to select a bit and predetermined bits for parity check from the output of the memory block to thereby conduct a parity check of the selected bits. Thus, the information which is output from each memory block includes an output bit which has not yet been subjected to error correction and an intermediate result of syndrome calculation. From the viewpoint of the number of wirings required, it is possible to select one or a relatively small number of wirings required for the former, i.e., the output bit, and the number of wirings required for the latter, i.e., the intermediate result of syndrome calculation, is equivalent to the number m of bits used for syndrome calculation. Accordingly, the number of output wirings required for each memory block, which is the sum total of the above-mentioned numbers of wirings, is smaller than in the case of the prior art, i.e., k/b. In other words, the arrangement of the present invention enables a reduction in the number of output wirings required to extend from each memory block.

BRIEF DESCRIPTION OF THE DRAWINGS

FIG. 3 is a block diagram of one memory block for storing information bits and peripheral circuits thereof employed in the embodiments of the present invention;

DETAILED DESCRIPTION

Embodiments of the present invention will be described hereinunder with reference to the accompanying drawings. Although in the following one example in which Hamming codes are employed as ECCs is described, the present invention may also be applied to arrangements wherein other kinds of code, e.g., horizontal and vertical parity or BCH codes, are employed. Further, although in the following the present invention is applied to a DRAM (Dynamic Random Access Memory), the invention may also be applied to other types of semiconductor memory, e.g., SRAM (Static Random Access Memory) or ROM (Read-Only Memory). It is also possible to apply the present invention to a multi-value memory in which multi-value information is stored in a single memory cell. In this case, it is an effective practice to employ a multi-dimensional code as an ECC, as discussed in Japanese Patent Laid-Open No. 60-163300 (1985).

Figure 1:
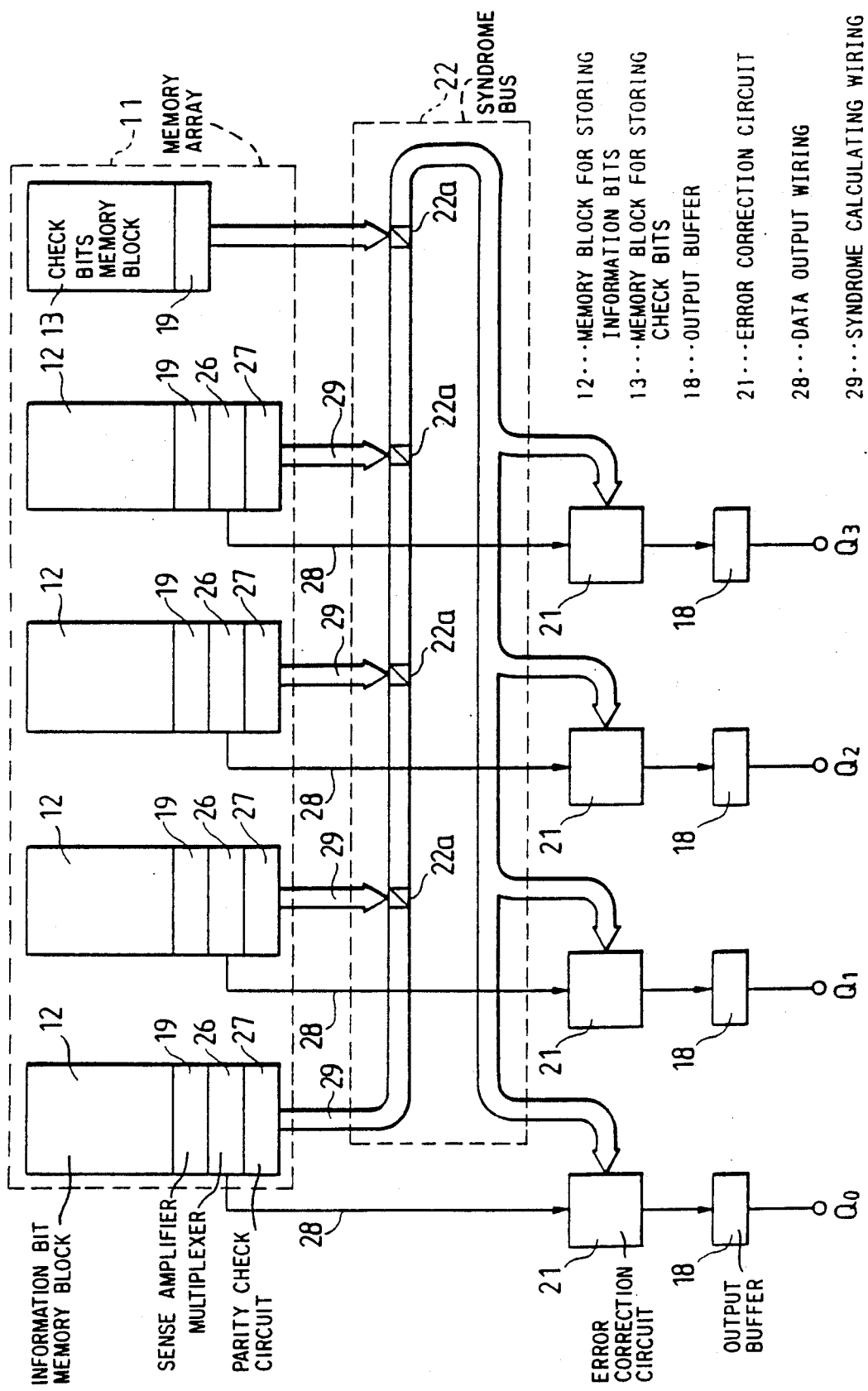
FIG. 1 is a block diagram of a semiconductor memory according to one embodiment of the present invention.

Referring first to FIG. 1, which is a block diagram of one semiconductor memory according to a embodiment of the present invention, the reference numeral 11 denotes a memory array, 12 memory blocks for storing information bits, 13 a memory block for storing check bits, 18 output buffers, 19 sense amplifiers, 21 error correction circuits, 22 a syndrome bus, 26 multiplexers, and 27 parity check circuits. In this semiconductor memory, the memory array 11 is divided into a plurality (b; b=4 in this embodiment) of memory blocks for storing information bits and one memory block 13 for storing check bits in the same way as in the related art.

This embodiment differs from the related art in that a combination of a multiplexer 26 and a parity check circuit 27 is provided in direct connection with the output section of each memory block 12 and that data output wirings 28 and syndrome calculating wirings 29 are separated from each other. In the above-described related art, readout data itself is output from each memory block; therefore, the number of output wirings needed for each memory block is k/b. In the present invention, however, the combination of a multiplexer 26 and a parity check circuit 27 is disposed in direct connection with the output section of each memory block 12 and therefore an intermediate result of syndrome calculation is output from each memory block 12 through the wiring 29. The number of wirings needed for this output is equal to the number m of bits used for syndrome calculation. In this embodiment, as a data output only one bit which is selected by the multiplexer 26 is output from each memory block 12 through the wiring 28. After all, the total of output wirings needed for each memory block 12 is (m+1), which-is much smaller than in the case of the related art, i.e., k/b. For example, in the case where k=128, m=8 and b=4, the total number of output wirings in this embodiment is m+1=9, while the total number of output wirings in the related art is k/b=32. Thus, the number of wirings needed in this embodiment is about 30% of that in the related art. It should be noted that the advantage of the related art that the number of relatively long wirings for connection between the memory blocks in m (2 m for the total number of outgoing and incoming wirings) also applies to this embodiment.

Figure 2:
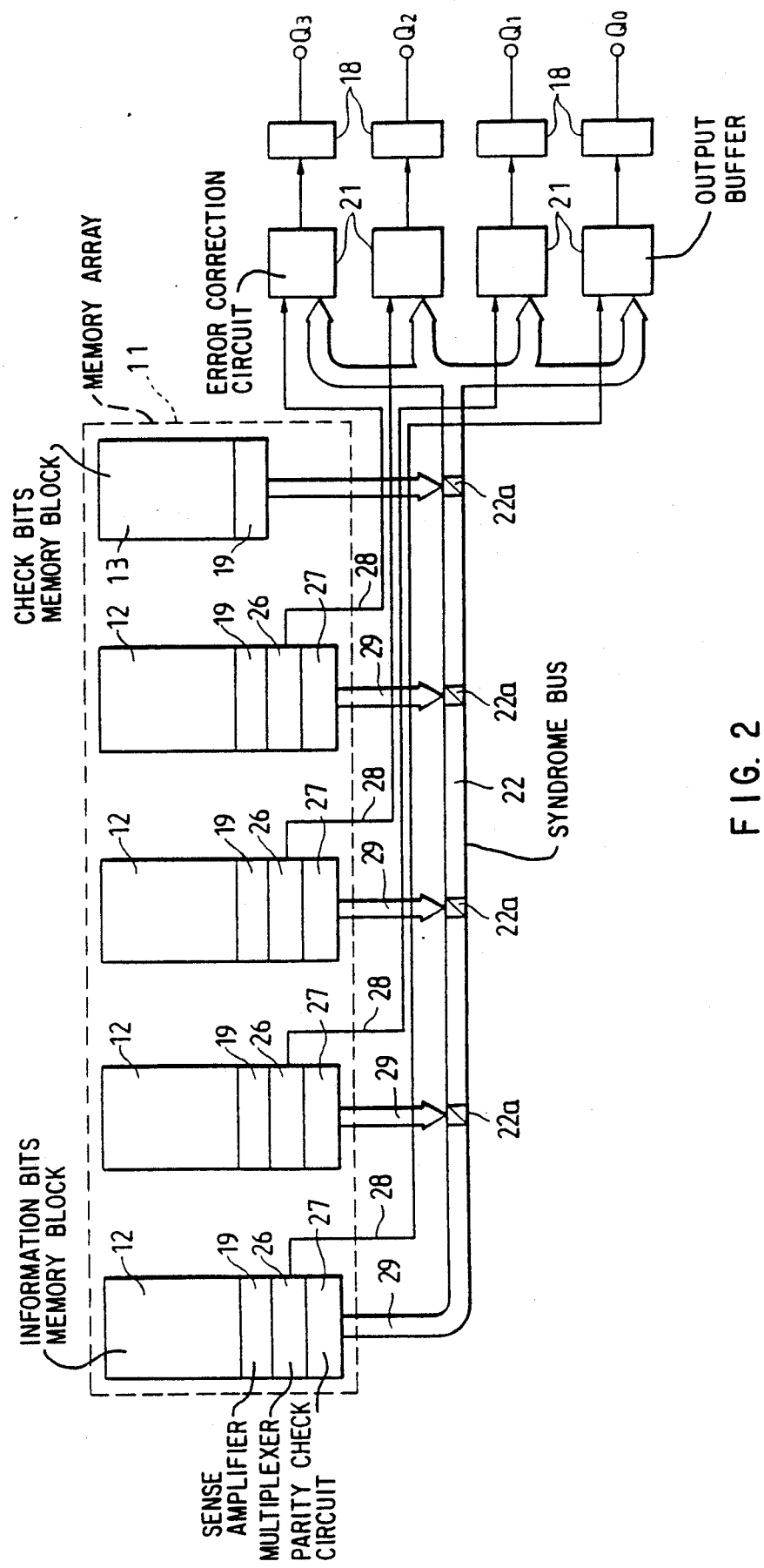
FIG. 2 is a block diagram of a semiconductor memory according to another embodiment of the present invention.
Figure 7:
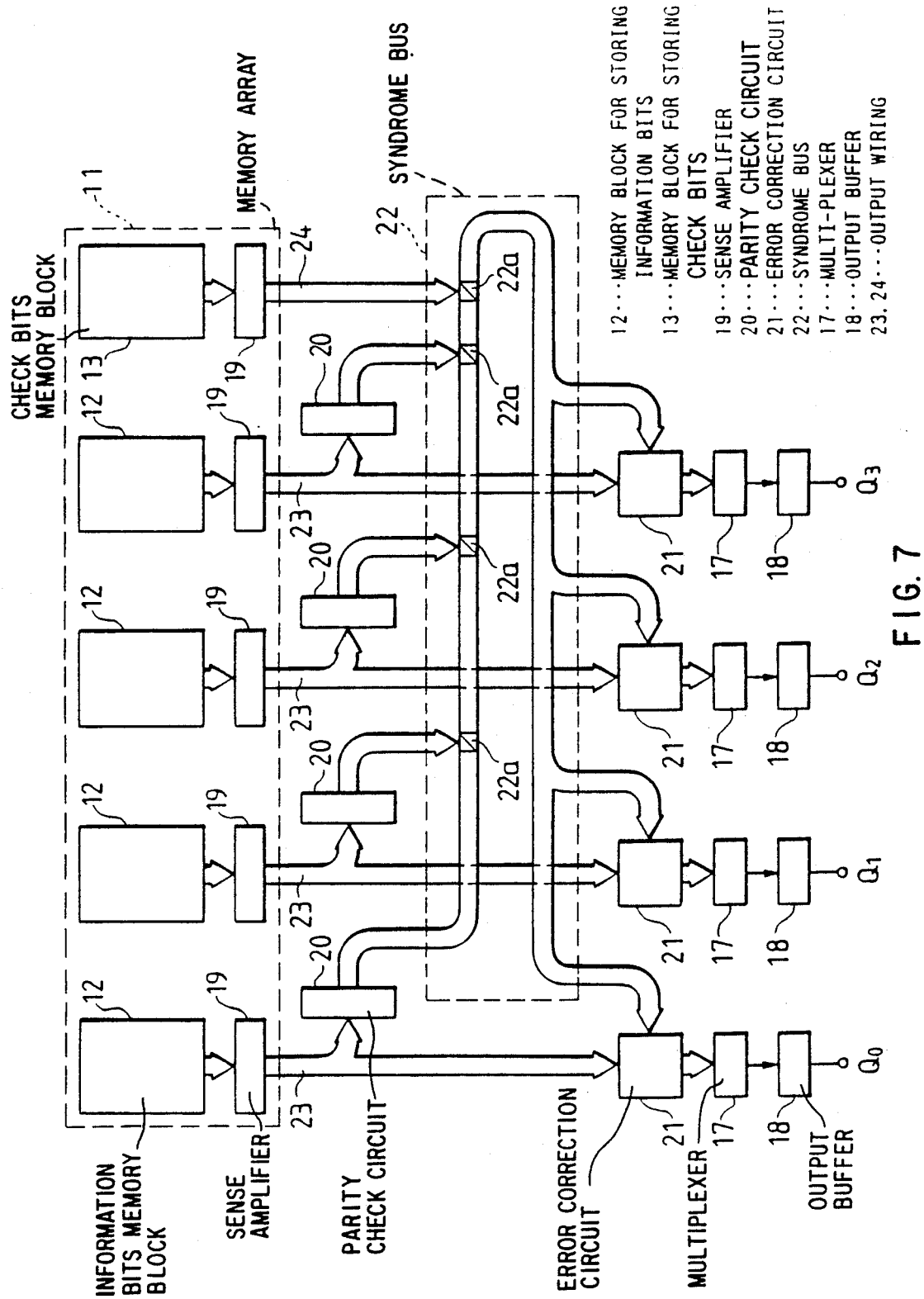
FIG. 7 is a block diagram of a semiconductor memory according to the related art.

FIG. 2 is a block diagram of a semiconductor memory according to another embodiment of the present invention. This embodiment differs from the first embodiment shown in FIG. 1 in the method of wiring the syndrome bus 22. In the arrangement shown in FIG. 1, the syndrome bus 22 is wired so as to extend in one direction and return in the other direction which is reverse to it; therefore, a total of 2 m wirings are needed. In the embodiment of FIG. 2, however, it is only necessary to provide m wirings. It should, however, be noted that it is necessary to provide b data output wirings 28 between the memory blocks 12 and the respective error correction circuits 21. Accordingly, the total of relatively long wirings for connection between the memory blocks is (m+b) and, if b<m, then the total number of relatively long wirings is smaller than 2 m. Further, since the wiring length of the syndrome bus 22 is shorter than that in the arrangement shown in FIG. 1, the parasitic capacitance and parasitic resistance of the wirings are reduced, so that it is possible to increase the speed of error correction. In addition, since the error correction circuits 21 are concentrated on one place, the chip area utilization efficiency is increased. The fact that it is possible to arrange the syndrome bus such that it does not return but extends in only one direction is owing to the advantage of the present invention that it is possible to reduce the number of relatively long wirings for connection between the memory blocks to (m+b).

The memory blocks in the embodiments shown in FIGS. 1 and 2 will next be described in detail. FIG. 3 is a circuit diagram showing one memory block for storing information bits and peripheral circuits thereof. Although in this example the present invention is applied to a DRAM (Dynamic Random Access Memory), the invention may also be applied to other types of semiconductor memory, as described above.

One memory block 12 comprises k/b memory sub-blocks 100 which are disposed vertically as viewed in FIG. 3. Similarly, the sense amplifier 19, the multiplexer 26 and the parity check circuit 27 comprise k/b sub-blocks 110, 120 and 130, respectively. The parity check is conducted for data consisting of a total of k/b bits which are selected from the memory sub-blocks 100, respectively, i.e., one bit from each memory sub-block.

In each memory sub-block 100, d pairs of bit lines $B_j$ and $\overline{B}_j$ (j=0~d−1) are disposed and a memory cell 101 which comprises a MOS transistor 102 and a capacitor 103 is disposed at each of the intersections of word lines $W_i$ and the bit line pairs. In each sense amplifier sub-block 110 are disposed d differential amplifiers 111 for each differentially amplifying the voltage between a pair of bit lines $B_j$ and $\overline{B}_j$. It should be noted that, although the illustrated bit lines are of the so-called folded bit line type in which each pair of bit lines are disposed parallel with each other, the open bit line type arrangement may be adopted instead.

The multiplexer 26 selects a total of k/b bits from the memory sub-blocks 100, one from each sub-block, for a parity check. In addition, the multiplexer 26 selects one bit from the entire memory block 12 for the data output. Decoders 140 and 141 control these bit selecting operations, respectively. Each decoder 140 connects only one of the d pairs of bit lines within the corresponding memory sub-block 100 to a pair of sub-input/output lines $a_j$ and $\overline{a}_j$ through a pair of MOS transistors 121 and 122. Thus, the information on the selected bit line pair is sent to the corresponding parity check sub-block 130 through the sub-input/output lines $a_j$ and $\overline{a}_j$. On the other hand, the decoder 141 connects only one of the k/b pairs of sub-input/output lines $a_j$ and $\overline{a}_j$ to a pair of common input/output lines I/O and $\overline{I/O}$ through a pair of MOS transistors 123 and 124. Thus, the information carried on the selected bit line pair is output through the sub-input/output lines $a_j$ and $\overline{a}_j$ and the common input/output lines I/O and $\overline{I/O}$. It should be noted that the common input/output lines I/O and $\overline{I/O}$ are connected to the corresponding error correcting circuit 21 shown in FIG. 1 as being data output wirings 28. It should be also noted that the layout of the multiplexers and the decoders is not necessarily limited to the illustrated example. For example, the arrangement may be such that multiplexers and decoders 140 for the parity check are disposed at one side of the memory block and a multiplexer and a decoder 141 for the data output operation are disposed at the other side of the memory block. Although in the foregoing the decoders are provided for each memory block, the arrangement may also be such that only one decoder is provided at one end of the chip and the output signal from the decoder is distributed to each memory block, as presented in Japanese Patent Laid-Open No. 57-198592 (1982), instead of providing decoders for each memory block.

The parity check circuit 27 conducts a parity test of data sent through the sub-input/output lines $a_j$ and $\overline{a}_j$ (j=0~k/b−1). In the circuit 27 are disposed m parity check signal lines 131 which extend vertically as viewed in the figure, and results $p_0$ to $p_{m-1}$ of the parity check are output from the respective upper ends of the signal lines 131. It should be noted that the signal lines 131 for outputting the parity check results $p_0$ to $p_{m-1}$ are connected to the syndrome bus 22 shown in FIG. 1 as being syndrome calculating wirings 29. Exclusive OR gates 132 are respectively provided at some of the intersections (there are a total of mk/b intersections) of the signal lines 131 and the sub-input/output lines $a_j$ and $\overline{a}_j$. At each intersection where an exclusive OR gate 132 is provided, the exclusive OR of the signal carried on the corresponding sub-input/output lines $a_j$, $\overline{a}_j$ and a signal 131 which is input thereto from the lower side of the figure is output toward the upper side of the figure. At each intersection where no gate 132 is provided, a signal 131 input from the lower side is sent toward the upper side as it is. Whether or not an exclusive OR gate 132 is provided at an intersection is determined according to the ECC parity check matrix used. The parity check method will next be explained.

The following is a description of the parity check conducted in the case where as an ECC a Hamming code in which the number k of information bits is 32 and the number m of check bits is 6 is employed and the number b of memory blocks is 4. The parity check matrix is assumed to be as follows:

$$H = \begin{pmatrix} 11111000 & 00000001 & 11111111 & 10000000 & 100000 \\ 10000111 & 10000001 & 11100000 & 01111110 & 010000 \\ 01000100 & 01110001 & 00011100 & 01110001 & 001000 \\ 00100010 & 01001100 & 10010011 & 01001101 & 000100 \\ 00010001 & 00101010 & 01001010 & 10101011 & 000010 \\ 00001000 & 10010110 & 00100101 & 10010110 & 000001 \end{pmatrix} \quad (2)$$

The syndrome s is the product of H and the vector a obtained by arranging the information bits $a_0$ to $a_{31}$ and check bits $a_{32}$ to $a_{37}$ read out from the memory as follows:

$$a = \begin{pmatrix} a_0 \\ \cdot \\ \cdot \\ \cdot \\ a_{37} \end{pmatrix} \quad (3)$$

Thus, the syndrome s is expressed as follows:

$$s = Ha \quad (4)$$

Here, the addition is carried out in a binary manner. More specifically, if the result of the addition is odd, "1" is output, whereas, if the result is even, "0" is output. To perform the syndrome calculation, the product of a part of H and a part of a is calculated in each memory block. For example, in the first memory block for storing information bits, the product of a part of H, i.e., $H_1$, and a part of a, i.e., $a_1$, is calculated:

$$H_1 = \begin{pmatrix} 11111000 \\ 10000111 \\ 01000100 \\ 00100010 \\ 00010001 \\ 00001000 \end{pmatrix} \quad (5)$$

$$a_1 = \begin{pmatrix} a_0 \\ \cdot \\ \cdot \\ \cdot \\ a_7 \end{pmatrix} \quad (6)$$

Figure 4:
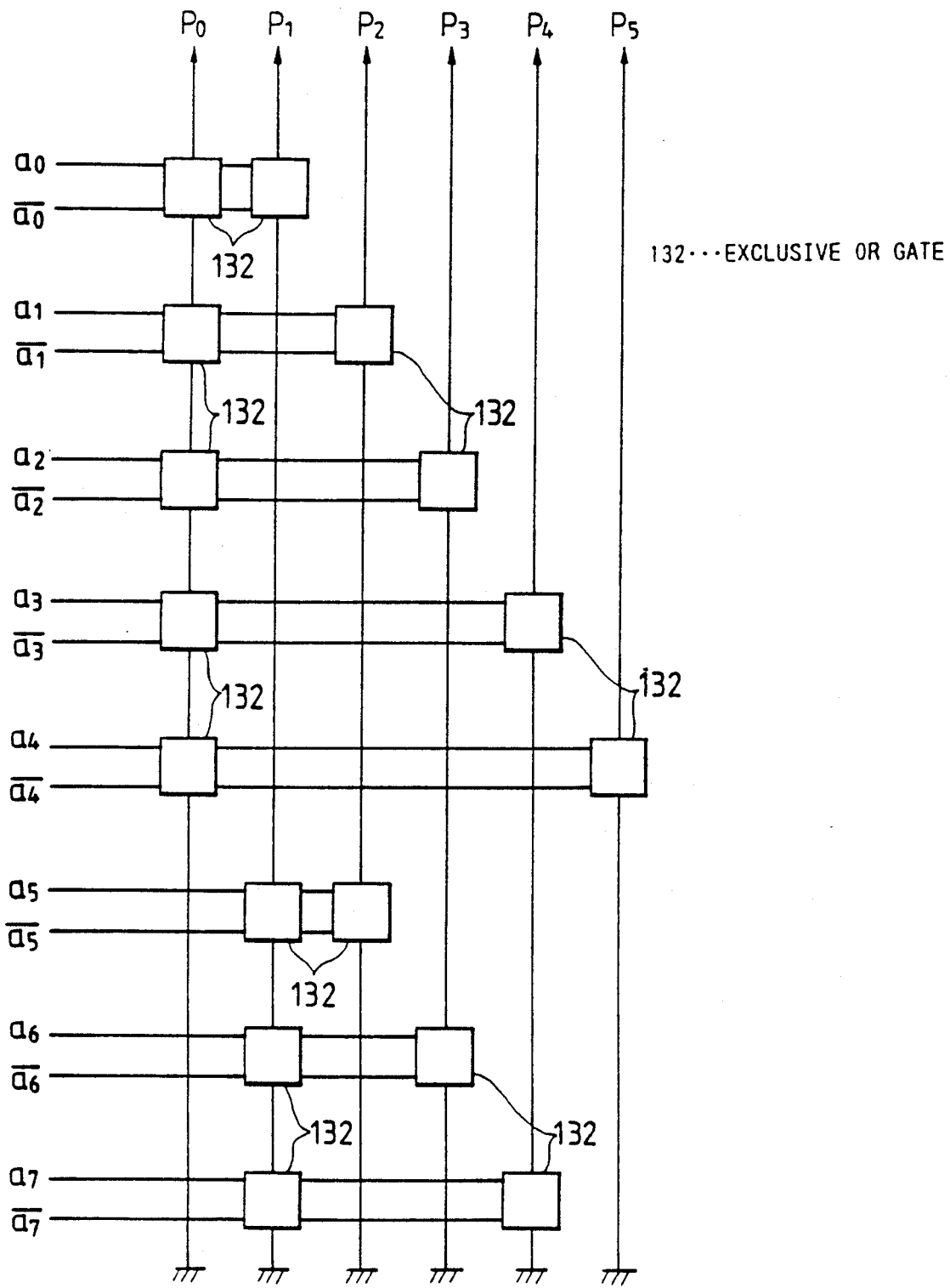
FIG. 4 is a circuit diagram showing the arrangement of exclusive OR gates in a parity check circuit in the embodiments of the present invention.

For this purpose, an exclusive OR gate is provided at a position which corresponds to "1" in $H_1$, while no gate is provided at a position which corresponds to "0". More specifically, exclusive OR gates may be disposed as shown in FIG. 4.

It should be noted that the parity check matrix is not necessarily limited to that shown in the expression (2). Since "1" in the matrix corresponds to one exclusive OR gate, it is preferable for increasing the speed of the parity check that the number of 1s be as small as possible and 1s be uniformly disposed in each row. For example, if the following is employed as a parity check matrix:

$$H = \begin{pmatrix} 10010001 & 01101001 & 01001001 & 10010010 & 100000 \\ 10010110 & 01000110 & 01010010 & 01100101 & 010000 \\ 00100110 & 01011001 & 10010100 & 01011010 & 001000 \\ 01100100 & 10010010 & 01100101 & 10010101 & 000100 \\ 01001001 & 10010100 & 10011001 & 00100110 & 000010 \\ 01011001 & 00101101 & 00100110 & 01001001 & 000001 \end{pmatrix} \quad (7)$$

then the number of exclusive OR gates which need to be connected to one parity check signal line in each memory block is no more than four, which is smaller than that (eight at most) in the case of employing the expression (2). Thus, it is possible to increase the speed of the parity check.

The feature of this circuit resides in that bits which are employed for one error correction are separated from each other by d bit lines. Accordingly, there is a very low probability that two or more bits which are employed for one error correction will be destroyed simultaneously by one incidence of alpha particles. Therefore, it is possible to satisfactorily make error correction with a single error correcting code without the need to employ a complicated multi-error correcting code.

In the foregoing embodiments, the number of signal lines required for parity check is m, which is the same as the number of bits employed for syndrome calculation. It is, however, possible to reduce the number of parity check signal lines by effectively modifying the parity check matrix. The following is a description of a method of reducing the number of signal lines required for parity check.

For example, the following parity check matrix is employed:

$$H = \begin{pmatrix} 01010101 & 01010101 & 01010101 & 01010101 & 100000 \\ 00110011 & 00110011 & 00110011 & 00110011 & 010000 \\ 00001111 & 00001111 & 00001111 & 00001111 & 001000 \\ 11111111 & 11111111 & 00000000 & 11111111 & 000100 \\ 11111111 & 00000000 & 11111111 & 11111111 & 000010 \\ 00000000 & 11111111 & 11111111 & 11111111 & 000001 \end{pmatrix} \quad (8)$$

More specifically, in the first to third rows, 1s and 0s are disposed in such a manner that array patterns which are different from each other are repeated in the first to third rows, respectively. In the fourth to sixth rows, an array pattern in which all eight columns are 0 and an array pattern in which all eight columns are 1 are disposed in such a manner that the fourth to sixth rows are different from each other in terms of the arrangement of the two different kinds of array patterns. Even such a parity check matrix satisfies the conditions for a single error correcting code. In this case, what the first memory block, for example, should do is to perform a calculation to obtain the product of the following two terms:

$$H_1 = \begin{pmatrix} 01010101 \\ 00110011 \\ 00001111 \\ 11111111 \\ 11111111 \\ 00000000 \end{pmatrix} \quad (9)$$

-continued $$a_1 = \begin{pmatrix} a_0 \\ \cdot \\ \cdot \\ \cdot \\ a_7 \end{pmatrix} \qquad (10)$$

More specifically, the first memory block must perform calculation as follows:

$$p_0 = a_1 \oplus a_3 \oplus a_5 \oplus a_7 \qquad (11)$$

$$p_1 = a_2 \oplus a_3 \oplus a_6 \oplus a_7 \qquad (12)$$

$$p_2 = a_4 \oplus a_5 \oplus a_6 \oplus a_7 \qquad (13)$$

$$p_3 = a_0 \oplus a_1 \oplus a_2 \oplus a_3 \oplus a_4 \oplus a_5 \oplus a_6 \oplus a_7 \qquad (14)$$

$$p_4 = a_0 \oplus a_1 \oplus a_2 \oplus a_3 \oplus a_4 \oplus a_5 \oplus a_6 \oplus a_7 \qquad (15)$$

$$p_5 = 0 \qquad (16)$$

Figure 5:
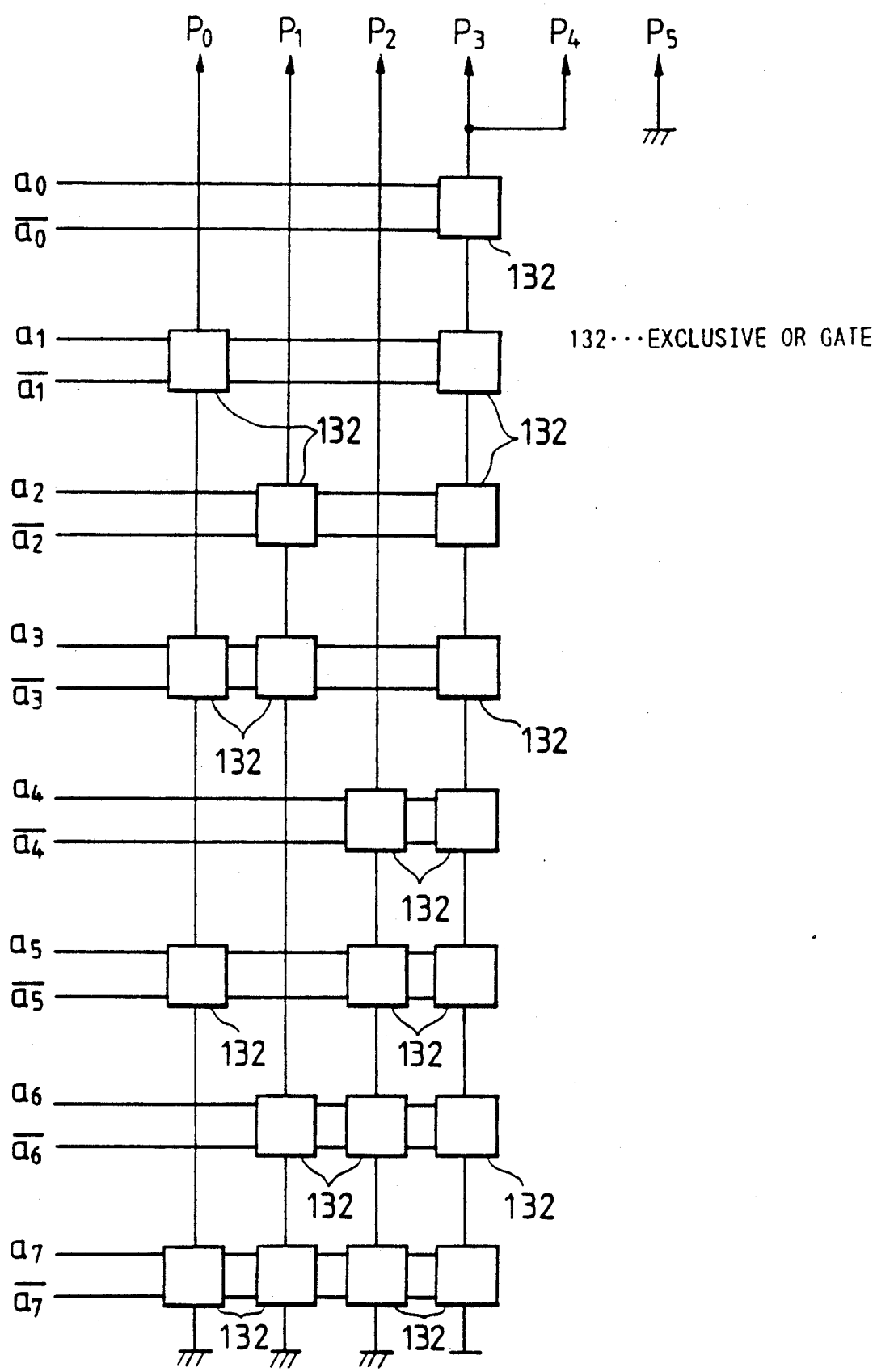
FIG. 5 is a circuit diagram showing one example of arrangements whereby the number of signal wirings needed for parity check is reduced.

In this case, however, $p_3$ and $p_4$ are the same and $p_5$ need not be calculated. Accordingly, it is necessary to carry out only four arithmetic operations, i.e., for $p_0$ to $p_3$. Since in the foregoing embodiments all of $p_0$ to $p_5$ need to be calculated, it is necessary to provide six (i.e., m=6) signal lines for parity check. In contrast, in this embodiment the number of parity bits which need to be calculated is four; therefore, it suffices to provide only four parity check signal lines, as shown in FIG. 5. It will be apparent from the expression (8) that the number of parity bits which need to be calculated is similarly four in each of the second to fourth memory blocks.

Thus, it is possible to make the number of parity check signal lines smaller than the number of bits employed for syndrome calculation by arranging the parity check matrix such that at least two bits among the output bits from the parity check circuit are constantly the same as each other as in the case of this embodiment wherein $p_3$ and $p_4$ are the same or such that at least one bit among the output bits from the parity check circuit is a constant which is independent of the information bits as in the case of this embodiment wherein $p_5=0$.

It should be noted that the parity check matrix (8) further has the advantage that 1s are regularly arranged, which facilitates the design of the parity check circuit.

Figure 6A:
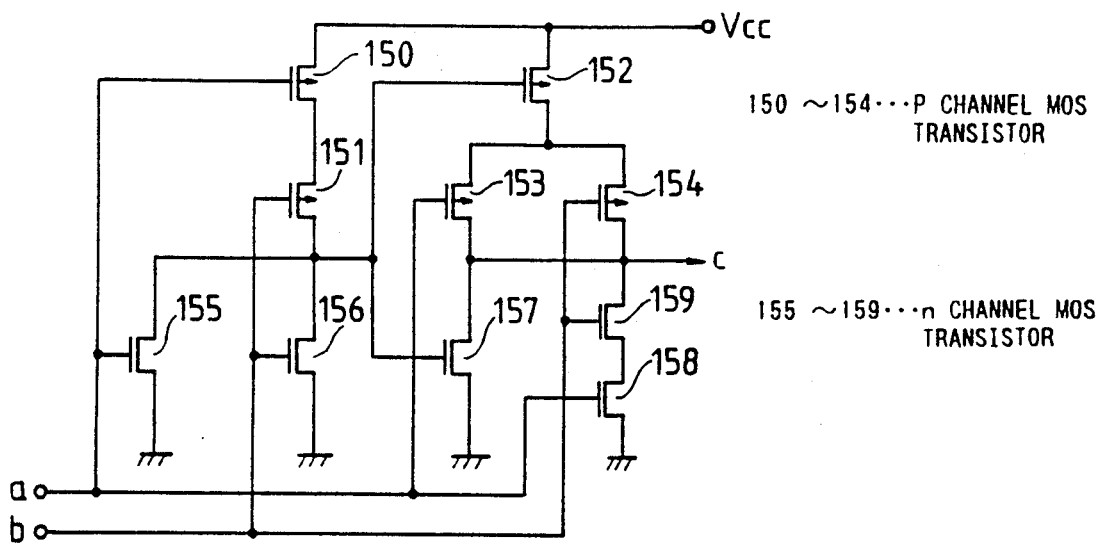
FIGS. 6(A) and 6(B) are circuit diagrams respectively showing examples of exclusive OR gates formed using CMOS circuits.
Figure 6B:
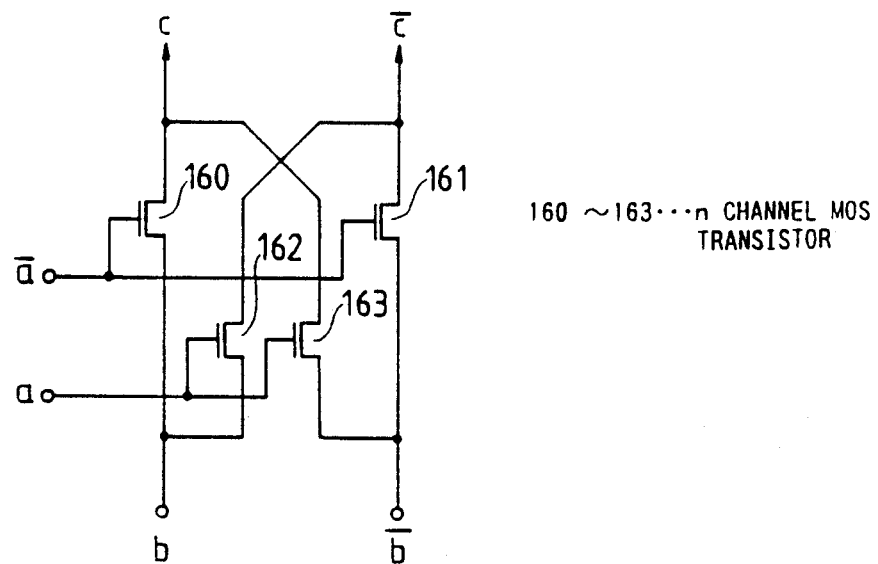

The following is a description of a method of realizing exclusive OR gates which are employed in the parity check circuit. FIG. 6(A) is a circuit diagram of an exclusive OR gate which is formed using a CMOS circuit. In the figure, the reference numerals 150 to 154 denote p-channel MOS transistors, and 155 to 159 n-channel MOS transistors. FIG. 6(B) shows another method of realizing exclusive OR gates. The circuit shown in FIG. 6(B) comprises four n-channel MOS transistors 160 to 163. In this circuit, a parity check signal is input on the basis of the differential relationship between b and $\bar{b}$ and output on the basis of the differential relationship between c and $\bar{c}$.

A sub-input/output line signal is also input on the basis of the differential relationship between a and $\bar{a}$. More specifically, when a=0 (low potential) and $\bar{a}=1$ (high potential), the transistors 160 and 161 are conductive, while the transistors 162 and 163 are not conductive; therefore, c=b and $\bar{c}=\bar{b}$. When a=1 and $\bar{a}=0$, the transistors 162 and 163 are conductive, while the transistors 160 and 161 are not conductive; therefore, c=$\bar{b}$ and $\bar{c}$=b. Thus, the output c is the exclusive OR of a and b. This circuit configuration has the advantage that the number of MOS transistors required is relatively small and the delay is small since b and $\bar{b}$ are input from the drains of the transistors.

As has been described above, the present invention enables a reduction in the number of output wirings required to extend from each memory block. More specifically, in the case where the number of information bits is 128, the number of check bits is 8 and the number of memory blocks for storing information bits is 4, for example, the number of output wirings required for each memory block in the present invention is 9 (i.e., 8+1) in marked contrast to 32 (i.e., 128/4) in the prior art. In other words, the number of output wirings required is reduced to about 30% of that in the prior art. Thus, it is possible according to the present invention to realize a semiconductor memory which is provided with an error correcting function with less increase in the chip area.

What is claimed is:

1. A semiconductor memory comprising:
   a) a memory array comprising:
      i) a plurality of information memory blocks storing information bits, each having an output section;
      ii) a check memory block storing check bits;
      iii) a plurality of multiplexers one disposed at the respective output section of each information memory block, each having a first output and a second output;
      iv) a plurality of parity check circuits, one coupled to the second output of each of said multiplexers, each of said plurality of parity check circuits receiving information bits for a parity check;
   b) a plurality of error correcting circuits, one for each information memory block having as one input information bits from the first output of the multiplexer of its respective memory block and having another input;
   c) a syndrome bus electrically coupled to the respective outputs of said parity check circuits, the output of said check memory block, and the other inputs of said plurality of error correction circuits; and
   d) each error correction circuit correcting the information bits supplied thereto from the first output of said multiplexer in response to a syndrome from said syndrome bus.

2. A semiconductor memory according to claim 1, wherein each of said multiplexers has a plurality of first switches selecting pieces of information bits in said respective information memory block and transmitting the selected pieces of information bits to said second output, each second output comprising a plurality of sub-input/output lines, respectively,
   wherein each of said multiplexers has a second switch selecting one of the pieces of information bits transmitted to said sub-input/output lines and transmitting the selected information bits to said second output, said second output comprising a common input/output line,
   wherein said sub-input/output lines of said multiplexers are connected to said parity check circuits, respectively, and wherein said common input/output lines of said multiplexers are connected to said error correction circuits, respectively.

3. A semiconductor memory according to claim 2, wherein said first and second switches are MOS transistors.

4. A semiconductor memory according to claim 3, wherein said information memory blocks include memory cells comprising only one transistor and only one capacitor.

5. A semiconductor memory according to claim 3, wherein said plurality of information memory blocks comprises at least 4 information memory blocks.

6. A semiconductor memory according to claim 5, wherein said syndrome bus is extended in one direction and returned in a second direction which is reverse to said one direction.

7. A semiconductor memory according to claim 5, wherein said syndrome bus is extended in one direction and not returned.

8. A semiconductor memory according to claim 3, wherein said syndrome bus is extended in one direction and returned in a second direction which is reverse to said one direction.

9. A semiconductor memory according to claim 2, wherein said information memory blocks include memory cells comprising only one transistor and only one capacitor.

10. A semiconductor memory according to claim 2, wherein said plurality of information memory blocks comprises at least 4 information memory blocks.

11. A semiconductor memory according to claim 10, wherein said syndrome bus is extended in one direction and returned in a second direction which is reverse to said one direction.

12. A semiconductor memory according to claim 10, wherein said syndrome bus is extended in one direction and not returned.

13. A semiconductor memory according to claim 2, wherein said syndrome bus is extended in one direction and returned in a second direction which is reverse to said one direction.

14. A semiconductor memory according to claim 1, wherein said information memory blocks include memory cells comprising only one transistor and only one capacitor.

15. A semiconductor memory according to claim 1, wherein said plurality of information memory blocks comprises at least 4 information memory blocks.

16. A semiconductor memory according to claim 15, wherein said syndrome bus is extended in one direction and returned in a second direction which is reverse to said one direction.

17. A semiconductor memory according to claim 15, wherein said syndrome bus is extended in one direction and not returned.

18. A semiconductor memory according to claim 1, wherein said syndrome bus is extended in one direction and returned in a second direction which is reverse to said one direction.

19. A semiconductor memory comprising:
  a) means for storing bits comprising:
    i) a plurality of means for storing information bits, each having an output section;
    ii) means for storing check bits;
    iii) a plurality of means for multiplexing, one disposed at the respective output section of each means for storing information bits, each having a first output and a second output;
    iv) a plurality of means for checking parity each coupled to the second output of said respective means for multiplexing, each of said means for checking parity receiving information bits for a parity check;
  b) a plurality of means for correcting errors, one for each means for storing information bits having as first input information bits from the means for multiplexing of its respective means for storing information bits and having second input;
  c) means for generating and transmitting a syndrome, electrically coupled to the respective outputs of said means for checking parity, the output of said means for storing check bits, and said second inputs of said plurality of means for correcting errors; and
  d) each means for correcting errors correcting the information bits supplied thereto from the first output of said means for multiplexing in response to a syndrome from said means for generating and transmitting.

20. A memory according to claim 19 wherein said means for generating and transmitting comprises a syndrome bus.

21. A method of reducing wiring in a semiconductor memory comprising:
  a) storing information bits in a plurality of information memory blocks in a memory array, each memory block having an output section;
  b) storing check bits in a check bit memory block in said memory array;
  c) multiplexing the respective output of each information memory block within the memory array to provide a first output and a second output;
  d) checking parity of each second output within the memory array, in response to information bits for a parity check;
  e) generating and transmitting a syndrome to a bus which is electrically coupled to respective third outputs and the output of said check bit memory; and
  f) correcting the information bits from the first output in response to a syndrome on said bus.

22. The method according to claim 21 wherein said step of correcting comprises supplying said first output and said syndrome to an error correction circuit.

* * * * *